(12) United States Patent
Baxi (10) Patent No.: US 9,133,042 B2
(45) Date of Patent: Sep. 15, 2015

(54) ROTATING BIOLOGICAL CONTACTOR APPARATUS AND METHOD

(75) Inventor: Indra R. Baxi, Troy, MI (US)

(73) Assignee: BIOMASS TECHNOLOGIES, LLC, Farmington, MI (US)

(*) Notice: Subject to any disclaimer, the term of this patent is extended or adjusted under 35 U.S.C. 154(b) by 576 days.

(21) Appl. No.: 13/409,248

(22) Filed: Mar. 1, 2012

(65) Prior Publication Data
US 2012/0152834 A1    Jun. 21, 2012

Related U.S. Application Data

(63) Continuation-in-part of application No. 12/970,055, filed on Dec. 16, 2010, now Pat. No. 8,460,548.

(51) Int. Cl.
*C02F 3/08* (2006.01)
*C02F 3/00* (2006.01)

(52) U.S. Cl.
CPC ............... *C02F 3/082* (2013.01); *C02F 3/006* (2013.01); *C02F 2209/005* (2013.01)

(58) Field of Classification Search
CPC .... C02F 3/006; C02F 3/082; C02F 2209/005; C02F 2209/008
USPC ............ 210/85, 141, 143, 150, 151, 614, 619
See application file for complete search history.

(56) References Cited

U.S. PATENT DOCUMENTS

| | | | |
|---|---|---|---|
| 1,811,181 A | 6/1931 | Malby | |
| 1,947,777 A | 2/1934 | Huff et al. | |
| 3,557,954 A * | 1/1971 | Welch | 210/151 |
| 3,596,767 A * | 8/1971 | Antonie | 210/614 |
| 3,630,366 A | 12/1971 | Joost | |
| 3,645,510 A | 2/1972 | Klugman | |
| 3,704,783 A | 12/1972 | Antonie | |
| 3,904,525 A | 9/1975 | Rosenberg | |

(Continued)

FOREIGN PATENT DOCUMENTS

| | | |
|---|---|---|
| EP | 0165730 | 12/1985 |
| EP | 0366477 | 5/1990 |

(Continued)

OTHER PUBLICATIONS

International Search Report and Written Opinion; Application No. PCT/US 11/63248; date mailed Apr. 23, 2012.

(Continued)

*Primary Examiner* — Christopher Upton
(74) *Attorney, Agent, or Firm* — Brooks Kushman P.C.

(57) ABSTRACT

A wastewater treatment facility with a rotating biological contactor ("RBC") that has a control system. The RBC sits in a tank that receives wastewater to be purified over which a reversible rotatable shaft is supported. One or more stages of rotating disk assembles progressively purify incoming wastewater. Each stage is oriented transversely to the shaft and has a plurality of disk assemblies. Each disk assembly has a number of disks that are sandwiched between end plates. Each of the disks comprises an innermost monolithic ring surrounded by multiple concentric truncated pie-shaped segments. Posts extend from the front and back faces of the disks for stirring wastewater and for offering numerous sites to which biomass may adhere and be suspended in the wastewater or exposed to ambient atmosphere during rotation.

22 Claims, 8 Drawing Sheets

(56) References Cited

U.S. PATENT DOCUMENTS

| | | |
|---|---|---|
| 4,115,268 A | 9/1978 | Thissen |
| 4,137,172 A | 1/1979 | Sako et al. |
| 4,149,972 A | 4/1979 | Iwai et al. |
| 4,275,019 A | 6/1981 | Bednarski |
| 4,289,626 A | 9/1981 | Knopp et al. |
| 4,330,408 A | 5/1982 | McClure |
| 4,345,997 A | 8/1982 | Mcconnell, Jr. et al. |
| 4,385,987 A | 5/1983 | McGinley et al. |
| 4,431,537 A | 2/1984 | Hirota |
| 4,444,658 A | 4/1984 | Hankes et al. |
| 4,504,393 A * | 3/1985 | Davies .................. 210/150 |
| 4,537,678 A | 8/1985 | Thissen |
| 4,549,962 A | 10/1985 | Koelsch |
| 4,563,281 A * | 1/1986 | Friedman et al. ......... 210/619 |
| 4,563,282 A | 1/1986 | Wittmann et al. |
| 4,568,457 A | 2/1986 | Sullivan |
| 4,604,206 A | 8/1986 | Sullivan |
| 4,608,162 A | 8/1986 | Hankes et al. |
| 4,668,387 A | 5/1987 | Davie et al. |
| 4,692,241 A | 9/1987 | Nicholson |
| 4,692,250 A | 9/1987 | Miller |
| 4,721,570 A | 1/1988 | Ankaitis |
| 4,724,593 A | 2/1988 | Lang |
| 4,729,828 A | 3/1988 | Miller |
| 4,737,278 A | 4/1988 | Miller |
| 5,227,055 A | 7/1993 | Timmons |
| 5,281,335 A | 1/1994 | Kuhn |
| 5,326,459 A | 7/1994 | Hlavach et al. |
| 5,395,529 A | 3/1995 | Butler |
| 5,401,398 A | 3/1995 | McManus |
| 5,407,578 A | 4/1995 | Nathwani |
| 5,419,831 A | 5/1995 | Fuerst et al. |
| 5,423,978 A | 6/1995 | Snyder et al. |
| 5,458,817 A | 10/1995 | Lang |
| 5,498,376 A | 3/1996 | St. Louis et al. |
| 5,637,263 A | 6/1997 | Lang et al. |
| 5,679,253 A | 10/1997 | Fuerst et al. |
| 5,714,097 A | 2/1998 | St. Louis et al. |
| 5,851,636 A | 12/1998 | Lang et al. |
| 5,853,591 A | 12/1998 | Snyder et al. |
| 6,071,593 A | 6/2000 | Lang et al. |
| 6,135,268 A | 10/2000 | Couch et al. |
| 6,241,222 B1 | 6/2001 | Lang |
| 6,403,366 B1 | 6/2002 | Kim |
| 6,540,920 B2 | 4/2003 | Bounds et al. |
| 6,783,669 B1 | 8/2004 | Okagawa et al. |
| 7,083,720 B2 | 8/2006 | Miller |
| 7,156,986 B2 | 1/2007 | Warrow |
| 7,811,449 B2 | 10/2010 | Warrow |
| 7,879,232 B2 | 2/2011 | Warrow et al. |
| 8,460,548 B2 * | 6/2013 | Baxi ......................... 210/150 |
| 2005/0133444 A1 | 6/2005 | Warrow |
| 2006/0113242 A1 * | 6/2006 | Ishikawa et al. ......... 210/143 |
| 2007/0231218 A1 | 10/2007 | Warrow |
| 2007/0231219 A1 | 10/2007 | Warrow et al. |
| 2008/0053880 A1 | 3/2008 | Miller |
| 2008/0210610 A1 | 9/2008 | Whiteman |
| 2009/0215142 A1 | 8/2009 | Tsai et al. |
| 2009/0250386 A1 | 10/2009 | Mayrand |
| 2010/0282654 A1 | 11/2010 | Hauschild |
| 2010/0328848 A1 | 12/2010 | Ledezma et al. |
| 2011/0017647 A1 | 1/2011 | Virloget |

FOREIGN PATENT DOCUMENTS

| | | |
|---|---|---|
| JP | S58150492 | 9/1983 |
| MX | 167652 | 3/1993 |
| MX | 9404071 | 5/1994 |
| MX | 185983 | 9/1997 |
| MX | 2008005486 | 12/2008 |
| WO | 9811025 | 3/1998 |

OTHER PUBLICATIONS

US Filter; "Applying the Rotating Biological Contactor Process"; (1998); Bulletin No. USF 315-13A6 cited in Cortez (p. 172), supra, published Jan. 24, 2008.

International Search Report and Written Opinion; International Application No. PCT/US13/28577; date of mailing May 6, 2013.

S. Cortez, R Teixeira, R. Oliveira, M. Mota, Rotating biological contactors: a review on main factors affecting performance, Rev Environ Sci Biotechnol (2008) 7:155-172.

International Preliminary Report on Patentability; International application No. PCT/US11/63248; date of mailing Dec. 18, 2012.

International Preliminary Report on Patentability; International application No. PCT/US2011/063248; date of issuance of report Feb. 25, 2014.

Supplementary Partial European Search Report; related European application No. EP 11848250; date of report Feb. 17, 2015.

* cited by examiner

ROTATING BIOLOGICAL CONTACTOR APPARATUS AND METHOD

CROSS REFERENCE TO RELATED APPLICATION

This application is a continuation in part of and claims priority to U.S. patent application Ser. No. 12/970,055 filed Dec. 16, 2010 now U.S. Pat. No. 8,460,548, the disclosure of which is incorporated in its entirety by reference herein.

TECHNICAL FIELD

The disclosure relates generally to rotating biological contactors and methods of deploying them in a wastewater treatment facility.

BACKGROUND

Conventionally, raw sewage enters a wastewater treatment facility through an inlet pipe. An equalization tank or its equivalent may contain miscellaneous debris together with a sewage screen, grit chamber, and a waterwheel for transporting flow to a primary settling tank. The waterwheel may be driven by a shaft that is coupled to a rotating biological contactor ("RBC").

The RBC typically has one or more banks of circular media ("disks") that are supported by the shaft. Banks of disks are then rotated by the shaft, which may also be turned by an electric motor. As the media rotate into and out of the wastewater, microorganisms attach themselves to the media. Such microorganisms proliferate when exposed to, for example, ambient oxygen. Often, a system's capacity to treat wastewater is a function of the surface area of reaction products ("biomass") thereby formed. As used herein, the term "biomass" means any organic source of energy that is renewable. Typically, contaminates contained in the wastewater include organic compounds such as hydrogen, carbon and oxygen that combine to form numerous other compounds. When this occurs over a large area, the weight of the dead microorganism is supported on the media surface area. Then an excessive build up will detach and fall. The microorganisms that consume the most common contaminates attach themselves to the media before multiplying to form a biomass in the form of a film.

Continuous rotation of disks in an RBC system provides the aeration and mixing necessary for treating wastewater. The effectiveness of the treatment and efficiency of output in part depends on oxygen transference. From the atmosphere, oxygen may be transferred by (1) absorption through a liquid film that flows over a disk surface; (2) direct oxygen transfer at an air/reactor liquid interface through turbulence created by rotating disks; and (3) direct oxygen absorption by microorganisms when exposed to the air.

A discussion of related technology is found in S. Cortez et al., "ROTATING BIOLOGICAL CONTACTORS: A REVIEW OF MAIN FACTORS AFFECTING PERFORMANCE", Rev. Environ. Sci. Biotechnol. 7:155-172 (2008), which is incorporated herein by reference.

A flexible disk will not be straight during assembly and is unable to maintain a parallel relationship with adjacent disks. This creates an uneven distance between various surfaces, and microorganisms will be prone to bridge between pins or adjacent surfaces. This will cause the media bank or circular media to require a higher torque for rotation. This is undesirable because the system's useful life will be reduced.

In some cases, an RBC may have multiple stages ("media assemblies").

Traditionally, in a first stage, the media surface area is presented to incoming wastewater, including microorganisms that naturally occur therein. As the disks rotate, the biofilm is formed on their surfaces. The biofilm metabolizes organic materials contained in the wastewater. In aerobic processes, rotating media promote oxygen transfer and maintain the biomass. Rotation also creates turbulence and enables excess solids to be removed or sloughed off from the media.

The microorganisms in typical wastewater normally form a microbial biofilm that grows over carrier material which is deployed in the disk bank(s) of the RBC. The media rotate at a speed of, for example, 1 to 5 RPM over a nearly stagnant bulk of wastewater and air. In operation, the film grows typically to a thickness of about 1-4 mm. When this occurs, the microorganisms that were the first to attach to the media die because no nutrient or oxygen can reach them. When this occurs over a large enough area, the biomass detaches itself from the media and sloughs off.

Media in use today typically include nested planar surfaces that are either flat or folded. They may, for example, be made of a mesh or a solid sheet. In known media assemblies, there is often a separation between adjacent disks. Extending from one side of conventional disks are projections that further engage the biomass. Both the flat and the folded types of media are spaced to provide a path that allows the sloughed biomass (i.e., biomass that has become detached from the media) to be removed from the media. This prevents plugging of the system which would reduce the media surface area exposed to contaminates in the wastewater and thus reduce the capacity of the system. Following traditional approaches, biomass interposed between adjacent disks may result in uneven spacing and the distortion of media surfaces. Such uneven spacing may produce clogging. In turn, this reduces the effectiveness of treatment and may weaken the disks that form the media.

Some media have variously shaped holes or open triangles that increase the surface area. However it is difficult using traditional methods to make a large section (e.g., 10 feet in diameter) and keep a flexible disk straight during assembly. Such components become expensive to produce, and generally have a shorter running life due to cracking and breaking.

In some prior art approaches, media growth of the biomass on some sections produces non uniform loading. This causes the media to exert a rotational torque that is higher than may be designed or desirable. Fracture of the shaft that carries the disk media often results and/or the media themselves may fracture. Moreover, prior art media often do not provide additional oxygen that is needed for biomass growth and survival to reduce sludge. Thus, prior art rotating media banks tend to collapse due to an imbalance of heavy buildup.

There are other disadvantages of conventional RBCs. From a process performance perspective, conventional RBCs have a limited oxygenation capacity. Because slowly rotating media may have about forty percent of their surface area immersed in the wastewater, a "dead zone" may exist near the center shaft. Solids accumulate near the center shaft because radial velocities are minimal, and the area is subject to little water scouring. Hence, traditional RBCs often fail to perform to the specifications of the original design. As noted above, the media have experienced problems of collapsing due to the weight of the solids build-up and retention. Additionally, many problems have been realized in the failure of the plastic media sheets to bond to the center shaft with which they rotate. Shaft problems have been experienced where the shaft shears under the load of excessive solids retained by the media. Because of this anticipated excessive loading, bearing problems have also been realized.

U.S. Pat. No. 7,156,986 is incorporated by reference. It discloses a pin and cone approach to spacing the media. However conical sections with long pins are difficult to manufacture economically. They are more rigid and can break (fail) during assembly. U.S. Pat. No. 7,879,232 discloses double-sided self-cleansing media. It is cumbersome to form a circular section. Cutting the periphery into a circular section can be challenging. That patent also is incorporated herein by reference.

It discloses a solid pin and solid cone approach to provide the equal spacing of media disk bank. However a solid conical section with a long pin tends to warp and a perpendicular relation is not maintained. This creates a mismatch and uneven gap between adjacent surfaces in the disk bank. Also, two media cannot easily be held together during assembly.

It would be desirable to augment the capacity of such treatment facilities without excessive cost and without impairing the effluent quality.

SUMMARY

In light of such previous approaches, needs exist for improved disk media with balanced rotational motion in combination with a control system with a speed reducer and/or an inverter drive. As used herein, an "inverter (or variable-frequency) drive" is a system for controlling the rotational speed of an alternating current (AC) electric motor by controlling the frequency of the electrical power supplied to the motor. http://en.wikipedia.org/wiki/Variable-frequency_drive.

Improved disk media include concentric segmented disk sections that facilitate disk assembly. Also, turbulating posts extend from opposite sides of disks, thereby offering a more effective surface area. Balanced rotational motion is in part enabled by the control system and an inverter drive that reverses the direction of rotation when certain conditions are met.

The control system and inverter drive (collectively herein, "system") permit automated operation at remote installation sites if desired without human intervention. The system influences angular acceleration, steady state speed, angular deceleration and direction of rotation when certain operational conditions are met. For example, the system can be programmed to avoid an overloaded accretion of biomass on the disk assemblies by monitoring current flow (I) or power (W). If the current flow required to drive the motor, the reducing gearbox and thus rotate the shaft exceeds a given level, the current is reduced, rotational speed(s) of the shaft diminishes and its direction of rotation is reversed after a period at rest. Also the system creates a slow buildup in speed as the shaft's rotational speed rises from zero to a desired angular speed. If desired, the control system can communicate wirelessly with a remote monitoring station which can alert a human operator should an abnormal operating condition exist or be impending.

Methods of fastening disks together are disclosed for long term reliable operation. The media do not require any machining, metal reinforcement or additional non-metallic components to assemble a full circle, as the inventive snap fit device is self-supporting and forms complete circles of various diameters.

Balanced rotation is also established in relation to a central shaft and motor with a gearbox and inverter drive that supports the media, accelerates the media, maintains a steady state of rotational speed, decelerates the media, stops it, allows it to remain stationary for a pre-established time (T), and if desired reverses the direction of rotation.

Preferably, at least some of the disks have a racetrack-like center mounting hole through which the central shaft is received. The hole has two curved sections that extend from two flat sections which desirably lie to each other. The non-circular mounting hole eliminates a fastening & holding mechanism otherwise required to keep the media securely in position with respect to the shaft. Slippage is eliminated. As the shaft rotates speeds up, or slows down, so also does the disk assembly.

One embodiment of the disclosure utilizes precisely designed circular pins ("turbulating posts") in large numbers. Tall circular pins, optionally with a hollow inner core that channels an irrigating flow of wastewater, augment the effective surface area. As a result, the film (scum) is broken and more wastewater may flow readily to the next media bank or stage.

A multi-height feature of the media allows the biomass to accrete during rotation. This also facilitates self-cleaning and increased oxygenation. Moreover, the hollow pin media carry a flow of wastewater that encourages the heavy build up of biomass to fall away from the media into an underlying tank.

Near the center of a disk, a flat planar surface without protruding posts is provided. Like a clearing in a forest, the flat planar surface allows more oxygen to be stored close to the axis of shaft rotation, where little if any agitation would occur. This eliminates or minimizes the dead zone. Surrounding the flat surface, for example between about 4 to 8 inches from the shaft center, is a cluster of connecting pins.

The media can be made from such materials as UV stabilized filled polyethylene or UV stabilized filled and unfilled polypropylene and high density polyethylene.

In one embodiment, there is a snap fitting engagement of media segments to hold segments in place that are associated with a particular disk. First (e.g., male) and second (e.g., female) snap-fitting features link adjacent segments in a disk.

Fluid influent is received by a semi cylindrical tank that is provided beneath an assembly of disks. It is preferably made of fiberglass by a vacuum form process, or by a fiber glass layup process, or high density polyethylene rotational molding, or a sheet forming process. Alternatively, the tank could be made of a metal or metallic alloy. If desired, the tank can be provided with one or more trap doors near its lowest point, which when opened will allow the build-up of solid or semi-solid waste to be flushed from the tank.

The formed circular disks are precisely spaced apart to enhance movement of wastewater and biomass holding, plus allow the biomass to be dumped or slough off once a certain weight is built up. Thus they are not subject to shaft breakage in normal use. The incorporation of precisely designed pins and spacing around and apart from the shaft allows biomass to slough off readily and eliminates a dead zone proximate the center of rotation, while allowing oxygen to penetrate close to the inner center of the media, outside the central shaft.

The media are spaced along a center shaft, which is supported with durable bearing supports. End plates are associated with media assemblies. The end plates secure member disks in the assembly and define holes through which load-bearing reinforcing rods or tubes for fluid flow extend. Optionally the rods, the tubes, or both may support paddles, buckets or T-shaped scoops at an end plate which secures disks in a given media assembly together. As the central shaft rotates, so also do the buckets or scoops. This motion captures ambient air and submerges it as their rotational path continues below the surface of the wastewater.

The inventive media have several characteristics that offer improved performance over conventional sheet media. In alternative inventive embodiments, there are octagonal wheels and circular structures that are non-corrosive due to their construction materials. One embodiment (mentioned earlier) has paddles ("buckets", "cups" or "scoops") or T-shaped tube endings that are optionally adjustable and positioned at the ends of spokes of the wheels. The paddles allow the media to trap air as the paddles enter the fluid during their rotational path. Somewhere toward the bottom of their rotational path, the paddles release the trapped air, which promotes oxygenation of the wastewater.

While the media continue on their rotational path in an upward direction, their pin-shaped surfaces lift the adherent biomass and associated liquid above the mean level of the wastewater. At some point toward the apex of their rotational path, the large and small circular pins allow at least some of the biomass to form and fall there between, thus promoting efficient aeration.

In alternative embodiments, the media are spaced to avoid collapse, using light flexible pins and snap studs. Optionally, the disclosed media pins are hollow axially, thereby allowing water to pass through small holes that create a balanced rotary motion and provide rotational momentum.

Thus, an object of one embodiment of the disclosure is to provide an RBC with a control system and improved circular media with various diameters.

A further object is to provide apertures in end plates that sandwich the disk media through which mounting rods or tubes may extend parallel to the main shaft to increase load bearing capacity and transfer loads from the media pins to the end plates.

Another object is to provide improved media pins to increase the surface area, reduce weight of disk banks and allow hanging biomass to fall into a collection tank.

Yet another object is to provide an improved pin design to increase surface area and (optionally) wastewater flow through axially oriented passages.

A still further object is to provide pins on both sides of a disk that connect a small pin to a large pin to form a fixed distance between each disk.

Another object is to provide side-mounted holding plates for securing media banks. Preferably, the plates are made from a material like polypropylene or high density polyethylene (HDPE) or aluminum or sheet metal.

A further object is to provide snap fit engagement between adjacent segments in a disk and scoops to enhance air supply to the biomass.

A still yet further object is to provide disks with optionally removable segments that can replace existing media, are simple in construction, economical to manufacture and efficient to use.

With the above and other objects in view, the disclosure includes a combination and arrangement of parts hereinafter more fully described, illustrated in the accompanying drawings and more particularly pointed out in the appended claims. It is to be understood that changes may be made in the form, size, proportions and minor details of construction without departing from the spirit or sacrificing any of the advantages of the disclosure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the claims.

BRIEF DESCRIPTION OF THE DRAWINGS

The present disclosure will become more fully understood from the detailed description and the accompanying drawings, wherein.

The same reference numerals refer to the same parts in the various Figures.

DETAILED DESCRIPTION

The disclosure relates to new and improved control systems and media for use in conjunction with a rotating biological contactor ("RBC") in a wastewater treatment facility.

Figure 1:
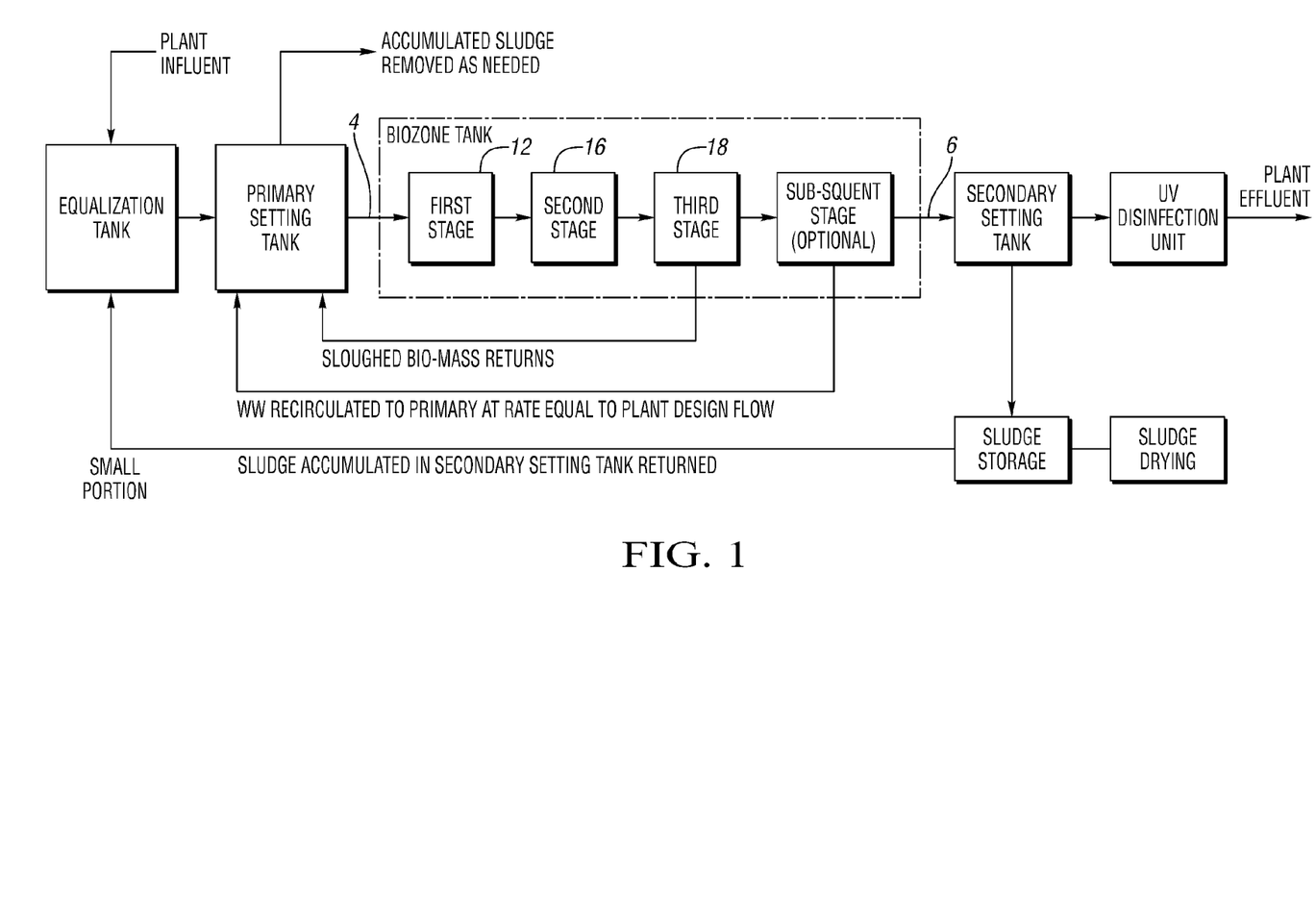
FIG. 1 is a schematic view of a wastewater treatment process.

To put the inventive RBC in context, a brief discussion now ensues about an exemplary wastewater treatment system, in which one embodiment of the disclosed RBC lies. In one form, a wastewater system (FIG. 1) has an equalization tank into which raw sewage including contaminants enters through an inlet pipe. Optionally, the equalization tank may include a mechanical sewage screen and a grit chamber, plus a waterwheel for transferring flow to a primary settling tank. In some cases, the waterwheel is driven by a linkage that is coupled to one end of an RBC shaft. The primary settling tank and a secondary settling tank located downstream from the RBC both provide storage for accumulated sludge. In a facility, there may be multiple RBC's that are operated in series or in parallel.

As depicted in FIGS. 1-4, the RBC has in one embodiment three stages, although the invention is not so limited. If desired, the direction of rotation can be reversed when certain conditions are met.

The control system, speed-reducing gear box and inverter drive (collectively herein, "system") permit automated operation at remote installation sites if desired without human intervention. If desired, one alternate embodiment uses a wired or wireless communication link to a monitoring station to which signals are sent that are indicative of an operating state of the RBC. In response, the remotely located operator may send signals back to the RBC by which its motion or lack thereof can be influenced.

The system influences angular acceleration, steady state speed(S), angular deceleration and direction of rotation when certain operational conditions are met. A representative logic flow diagram appears in FIG. 10. For instance, the system can be programmed to avoid an overloaded accretion of biomass on the disk assemblies by monitoring current flow (I) or power (W). If the current flow required to drive the motor and the reducing gearbox (and thus rotate the shaft) exceeds a given amount (e.g., 2 amps), the current is reduced. Then the rotational speed of the shaft diminishes and its direction of rotation can be reversed if desired after a period at rest. Also the system creates a slow buildup in speed as the shaft's rotational speed rises from zero to a desired angular speed.

In accordance with a first embodiment of the present invention, an RBC system 1 is provided in a wastewater treatment facility. One embodiment has:
   a. an elongate tank 2 with a longitudinal axis (X-X) and a lateral axis (Y-Y, FIG. 3);
   b. a rotatable shaft 8 that lies substantially parallel with the longitudinal axis (X-X);
   c. one or more stages 12, 16, 18 for progressively purifying incoming wastewater, each stage being oriented transversely to the shaft 8 in approximate parallel relationship with the lateral axis (Y-Y). Each stage has one or more disk assemblies.

Figure 3:
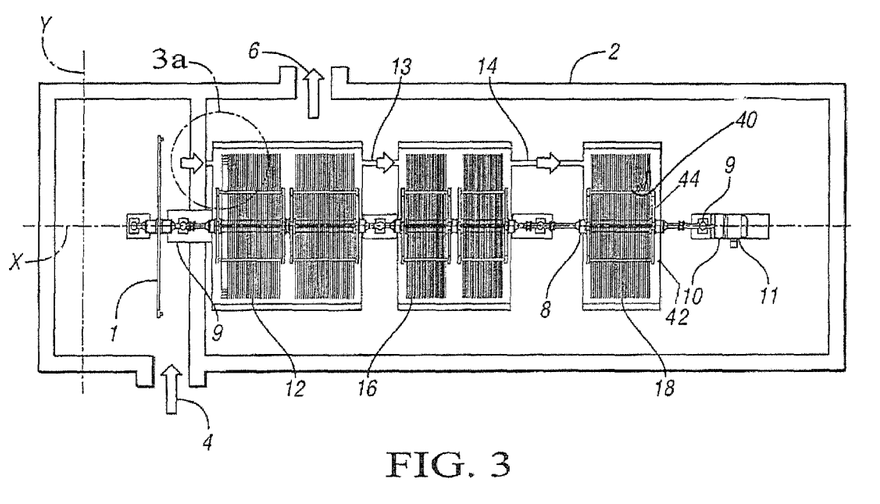
FIG. 3 is a top view thereof.
Figure 3A:
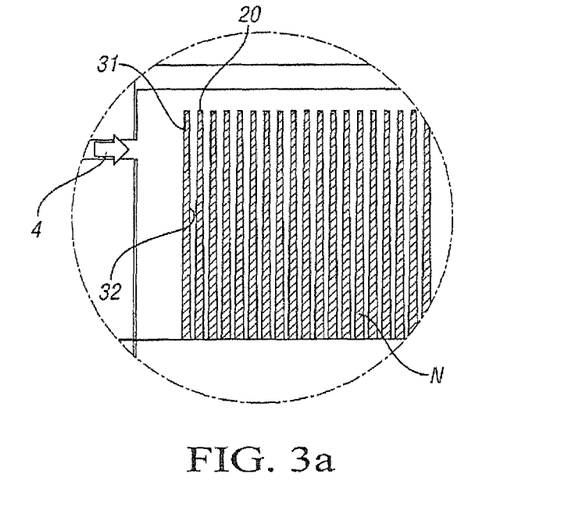
FIG. 3a enlarges a portion of it.

Each disk assembly has a number of disks 20 (FIG. 3*a*). End plates are associated with and effectively sandwich the media assemblies. The end plates secure member disks in the assembly and define holes through which load-bearing reinforcing rods 40 or tubes for fluid flow extend.

Figure 9:
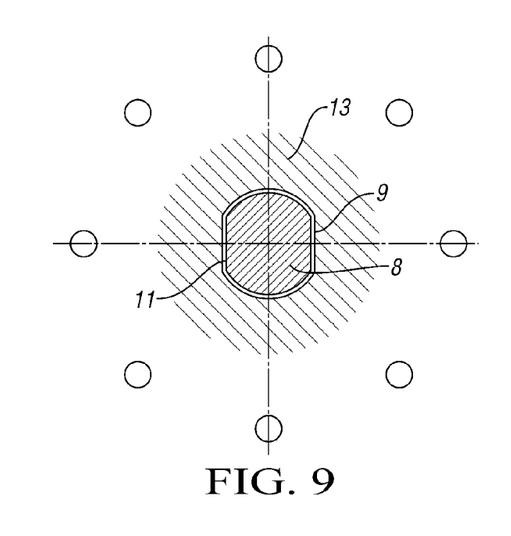
FIG. 9 illustrates a shaft-engaging aperture in a disk with a flattened area that surrounds the aperture.
Figure 9A:
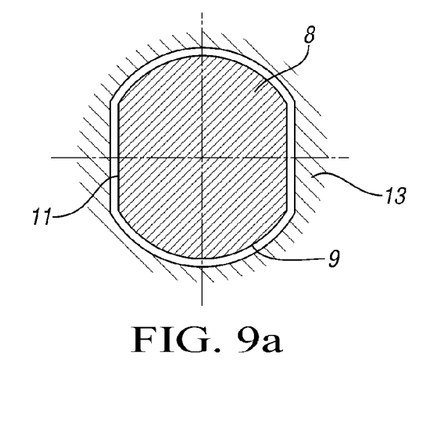
FIG. 9a is an alternate embodiment of the flattened area depicted in FIG. 9.
Figure 9B:
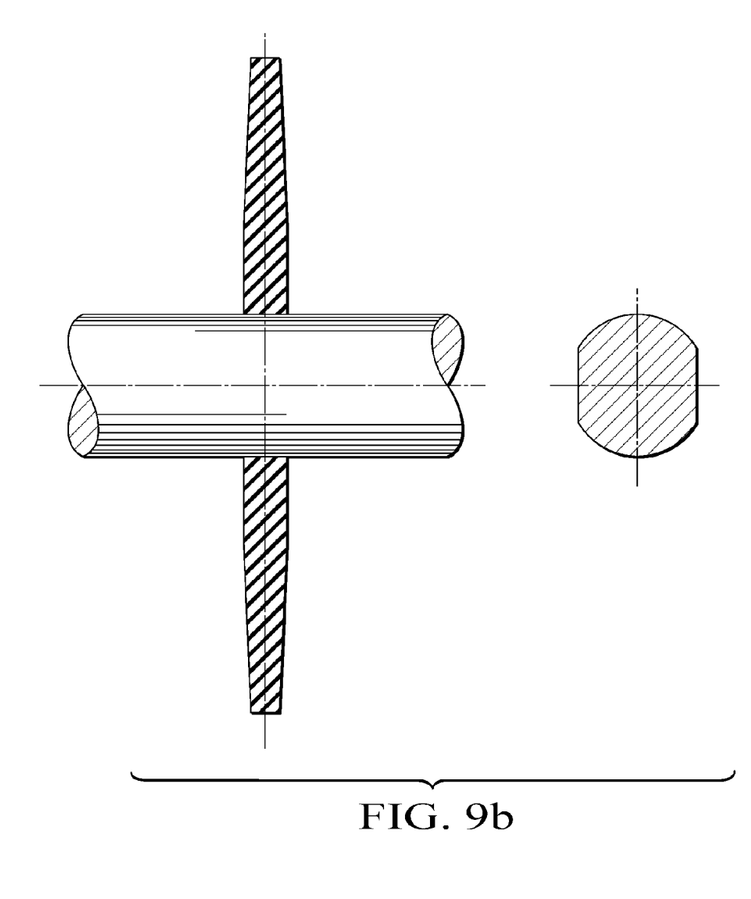
FIG. 9b depicts a curved (bulged) disk topography in the innermost monolithic ring of a disk.

Each disk 20 has a centrally located, non-circular—preferably racetrack-shaped—aperture 9 (FIGS. 5, 9 & 9*a*) that receives and engages with a rotating shaft 8. Preferably the shaft 8 has flattened longitudinal surfaces or splines 11 that register with the racetrack-shaped aperture 9. In this way, slippage is avoided. As used herein, "racetrack" means a shape defined by two opposing straight edges that are connected by a pair of facing curved sections. The term also includes other apertures whose shape is designed for registration with flattened axially extending faces on the shaft, e.g., hexagonal or other polygonal, etc. to avoid slippage and ensure that the shaft and associated media move in unison.

Figure 5:
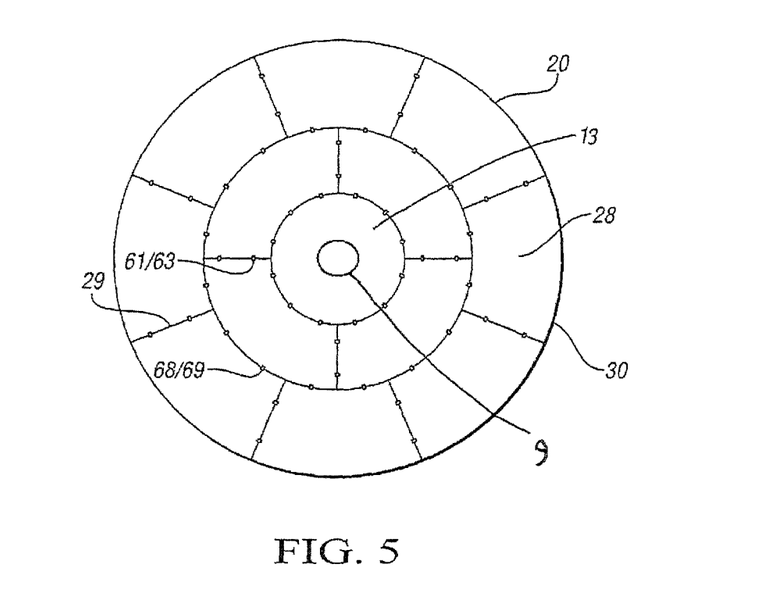
FIG. 5 is a side view of a multi-segmented disk.

Surrounding the centrally located aperture 9 is a planar surface (like a clearing in a forest) that may be crescent-shaped or annular (FIGS. 9 & 9*a*) which lacks turbulating posts 33. Biomass may readily slough off from posts surrounding the planar surfaces and drain across the planar surface before migrating downwardly towards the bottom of semi-cylindrical tanks that lie below the rotating media. The posts 33 extend from the front and back sides of the disks 20. In one example, the annular planar surface 13 is bounded by multiple concentric rings of segments 28 (FIG. 5). At least some of the segments 28 have faces exposed to air and wastewater that are (but need not be) imperforate. Each segment 28 that lies outside the annular planar surface 13 has:
   a. two generally radially extending edges 29; and
   b. two circumferential edges 30 that extend between the two radially extending edges 29.

At least some of the disks 20 each have
   a. a front face 31 and a back face 32 (FIG. 3*a*);
   b. a plurality of turbulating posts 33 (FIGS. 6-8) extending from the front 31 and back 32 faces for stirring wastewater and offering sites for adherence of biomass suspended in the wastewater;
   c. a plurality of tubular extensions 64 from the faces 31, 32 through which wastewater may flow. In some embodiments the extensions optionally are tubular or frusto-conical so as to define a flow channel 74 between tubular extensions 64 from and through opposing faces 31, 32 of a disk 20. The tubular extensions 64 have tips and a height of the tip that exceed the height of the posts 33 so that adjacent disks in an assembly of a stage 12, 16, 18 are connected and spaced apart by a mating relationship between tips of facing extensions 64 and by the rotatable shaft 8; and
   d. first (e.g., male) 63 and second (e.g., second) 61 engagement features ("snap-fit connections") also extending from edge regions of one of the front 31 and back 32 surfaces of a disk 20 that enable adjacent segments 28 of a disk 20 to be joined. Optionally, the first 63 and second 61 engagement features can be non-destructively separated after engagement to facilitate field repair and replacement of a segment 28 of a disk 20.

In preferred embodiments, any of the disks 20 may be made of a thermoplastic material. Their diameter can be sized up to about 12-15 feet. Other embodiments may assume different diameters, such as but not limited to 6 and 3 feet.

In one embodiment (FIG. 2), the three stages 12, 16, 18 of media are presented. This provides an efficient way to clean wastewater before an operator disposes of an effluent in a river or pond or for irrigation.

Figure 2:
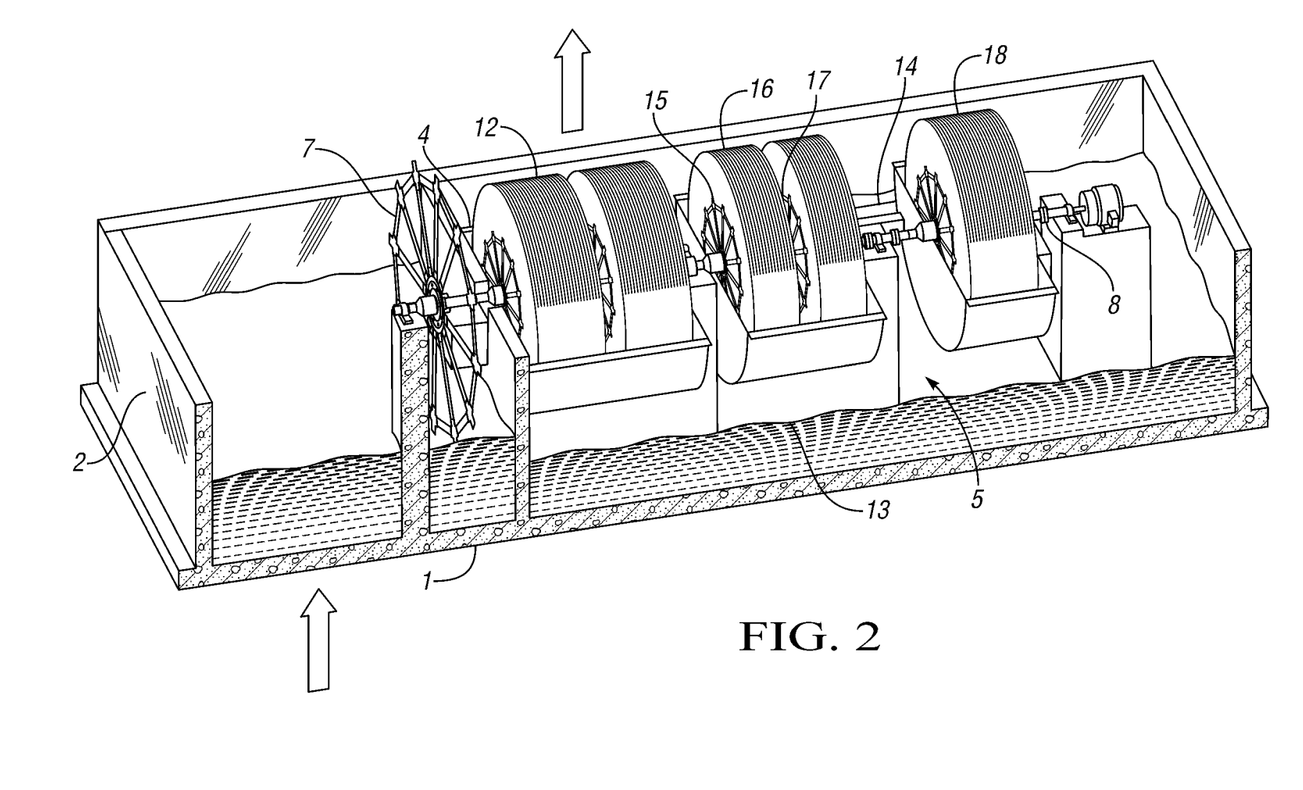
FIG. 2 is a partially sectioned, perspective view of a rotating biological contactor ("RBC") system, in accordance with one embodiment of the present disclosure.

It will be appreciated that the number of stages 12, 16, 18 is variable. In FIGS. 2-3, only three are depicted. It is understood that additional (or fewer) stages may be deployed if desired. FIGS. 2-3 depict two disk assemblies in the first stage 12, two disk assemblies in the second stage 16, and only one disk assembly 18 in the third stage or in a fourth stage (not depicted). The number of disks in an assembly may lie between two and about 99.

Turning now to FIG. 5, an exemplary disk 20 may be formed from the annular planar surface 13 and multiple concentric rings 34 of segments 28 are detachably attached to and around the outer periphery of the annular planar surface 13. In FIG. 5, for example, there are two rings that circumscribe the annular planar surface 13. Each ring 34 has a number of segments 28. The annular planar surface 13 has a bore or centrally located shaped aperture 9 with flats 11 that receive the rotating shaft 8 which has longitudinally extending flattened surfaces.

In an intermediate ring 34 (in the depicted embodiment) four (for example) segments are joined to the annular planar surface 13 and the outer ring segments (eight in number). In one embodiment, one or more disks 20 lie in a plane or planes with a topography that is substantially flat or convex (bulges in a central region around the centrally located aperture 9) with an axis of symmetry that is parallel to the longitudinal axis Y-Y. Preferably, the curved topography lies mostly in the annular planar surface 13, adjacent to the shaft 8.

Optionally, the turbulating posts 33 may droop or be bent downwardly in response to biomass weight so that the biomass may slough off the disks 20. Alternatively, one or more of the turbulating posts 33 may be formed as a fin-like projection that may move in relation to the wastewater in a knife-like manner. If a blunt edge of the knife-like post embodiment is presented to the wastewater, other things being equal, more turbulence will result. Conversely, if a sharper edge surface of the knife is positioned at the leading edge of the post as it moves in relation to ambient wastewater, the post will cleave through the wastewater, leave little turbulence in its wake, and be expected to have a longer useful life.

Figure 4:
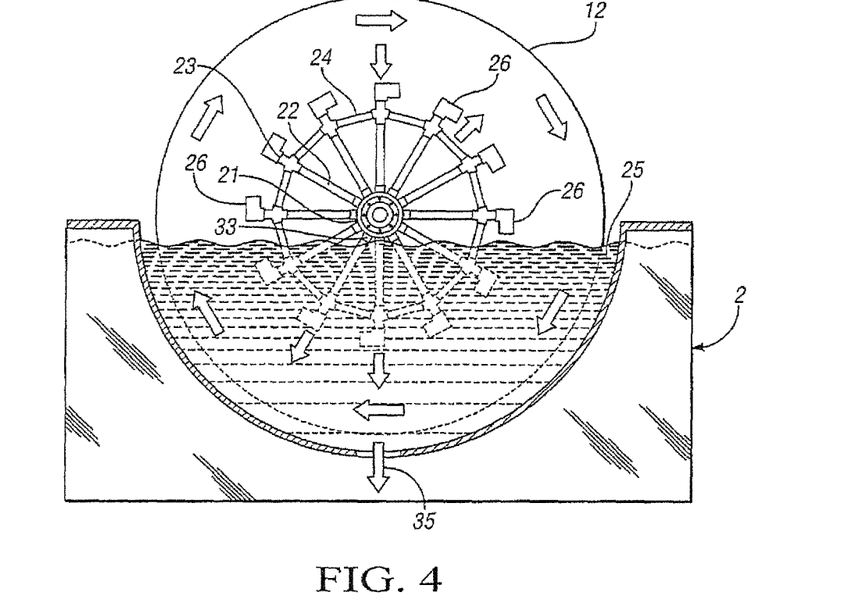
FIG. 4 is a left side elevational view thereof.

Turning now primarily to FIGS. 3-4, the RBC includes a wastewater inlet 4 and fluid outlet 6. In one embodiment, wastewater flows into a semi-cylindrical trough 25. Rotation of the RBC induces the wheel 7 and the scoops 26 to add air to a stage. A dead biomass dump 35 is positioned below one or more stages 12, 16, 18 of the RBC. The wastewater mixing and oxidation wheel 7, which may or may not be octagonal, is mounted on the rotatable shaft 8 and has one or more cups or T-shaped fittings 26 that scoop the wastewater to promote agitation and oxygenation. It will be appreciated that in FIG. 4 only eight such scoops 26 are shown. Alternatively, more or fewer scoops 26 could be provided on the wheel 7. If desired, the inclination of the scoops 26 in relation to the radially extending spokes of the wheel can be changed so as to influence when and where in their rotational path the air pockets retained in a scoop escape from the scoops as they pass through the wastewater. The T-shaped fittings 26 are oriented so that they effectively scoop and discharge when the direction of rotation is reversed.

Upon emerging from the fluid outlet 6 of the RBC, the fluid may pass to a secondary settling tank, filter tank, and perhaps to an ultraviolet disinfection unit for deducting clean water to a river, pond or underground.

Each stage 12, 16, 18 optionally has different surface areas for processing waste. Generally, the first stage 12 is coarse, a second stage 16 is medium and a third stage 18 includes a fine filter. The surface area becomes more dense as the waste passes through the stages from first to second to third stage.

The disclosed RBC offers a significant increase in the surface area of media banks exposed to the wastewater as compared to conventional media stacked systems. The disclosure provides an overall surface area exposure of 100 to 135 square feet per cubic feet of media in its initial stage. Turbulating posts and interconnecting tubes offer a high surface area for the growth of biomass, which is 3.5 to 5 times more than the surface area of conventional plastic corrugated, formed media, screen or flat media.

In one example, a disk having an outside diameter of 12 feet was constructed from an annular (innermost) planar surface 13, intermediate, and outer rings of segments. Respectively (as depicted in FIG. 5) there were 4 and 8 segments in the intermediate and outer rings. In the annular planar surface 13 there were 100,000-240,000 turbulating posts and between 400-900 mating extensions. In the intermediate ring, there were between 120,000-300,000 turbulating posts and 500-900 mating extensions. In the outer ring, there were 160,000-320,000 turbulating posts and 600-1,100 mating extensions.

In one exemplary disk assembly the average spacing between adjacent disks was about 1.75 inches. It will be appreciated that the spacing between the turbulating posts is selected so as to increase the surface area available for biomass attachment while minimizing any tendency of the biomass to bridge between adjacent posts.

Figure 10:
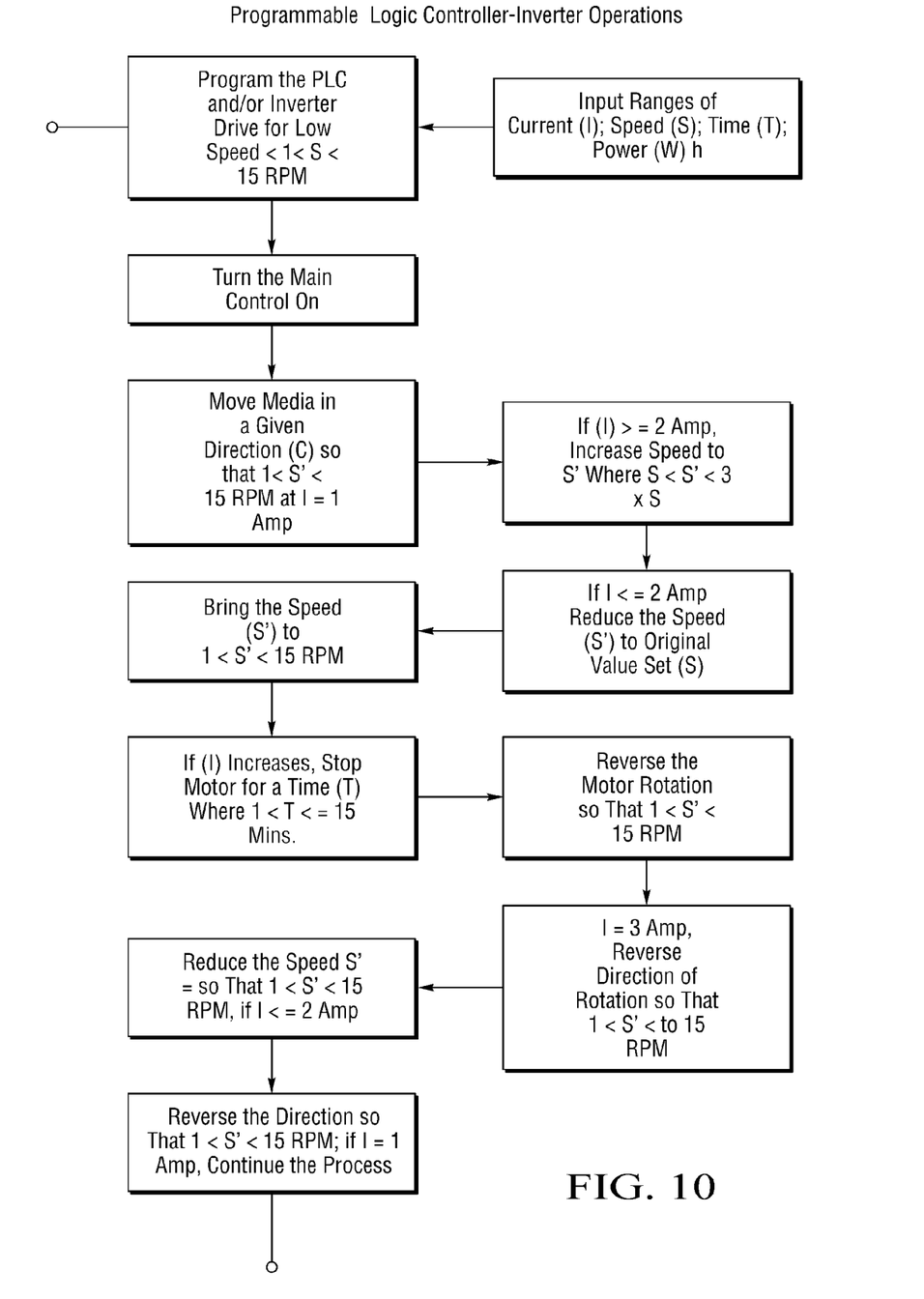
FIG. 10 is a flowchart that illustrates various control aspects of initializing and operating the disclosed wastewater treatment process.

An illustrative modus operandi is depicted in FIG. 10. It will be understood that the values of speed (S), amperage (I) and time (T) are for illustrative purposes only and that the invention is not so limited. Programming the system involves initialization and operational stages. Additionally or alternatively, power (W) can be monitored, where W=I×V and V=120, 240 or 460 volts.

In the initialization stage, ranges of allowable values for S, I and T for example are specified, together with critical values of for example I. In the operational stage, instructions are given via a PLC and/or an inverter drive and user interface that when for instance a critical value (e.g, I>2 amps) is reached, speed (S) must be reduced by lowering the current I to avoid an overload condition. Continuous monitoring by a control panel of current (I) will indicate when the mechanical load on the disk assemblies has lessened and thus when it will be acceptable to increase throughput by quickening the rotation speed (S) by raising the current level (I). Other variables include a vector that specifies the direction of rotation (R) and the time (T) of a phase of movement of the RBC (e.g., at rest for at time (T)=120 minutes; or movement clockwise (R=1 for T=24 hours).

In one embodiment, a control system is provided for remotely monitoring the programmable logic controller through the worldwide web so that suppliers and customers may control and change operating parameters for efficient and reliable operation of the facility.

One major advantage of this process is that it is simple and energy-efficient. The installation is cost competitive with other systems. However, the major cost advantages lie in its low energy requirements during operation. Output efficiency may be in the range of 3½ to 5 times that of conventional flat plastic media. The biological effectiveness of the process makes it attractive compared to current technology that does not optimize bacteria growth, nor utilize the biomass effectively.

Because individual segments of a disk can be mated by use of the snap fit connections 68, 69 (FIGS. 6-7), subassembly and field replacements are quite straight-forward because the segments are light in weight, unlike prior art assembly steps. For example, U.S. Pat. No. 4,549,962 discloses large subassemblies that are put together in a factory and then transported to the field for installation at the point of use. In some circumstances, such practices may damage the assembled disks in transit or during installation and otherwise be cumbersome to manipulate.

Figure 6:
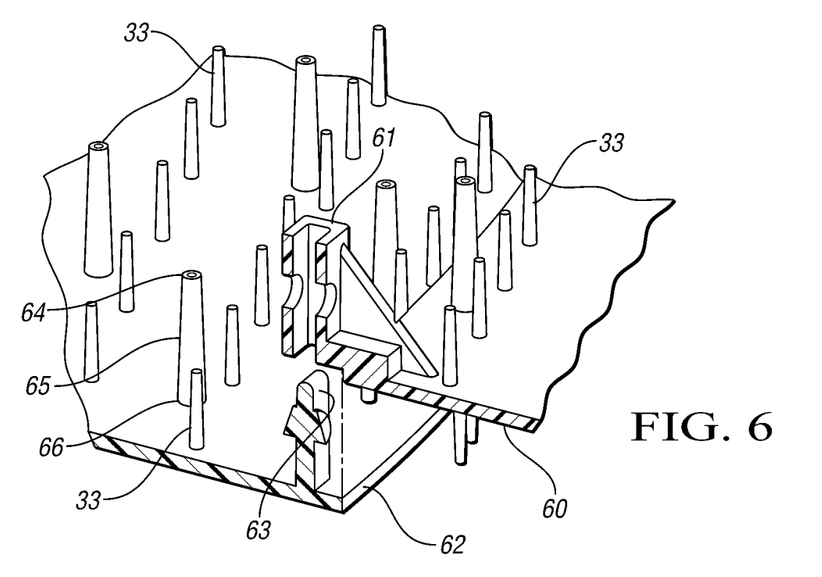
FIG. 6 is a quartering perspective view of two adjoining segments in a multi-segmented disk assembly, showing snap fit features therebetween for securing projecting elements of adjacent disk segments in place, in accordance with one embodiment of the present disclosure.
Figure 7:
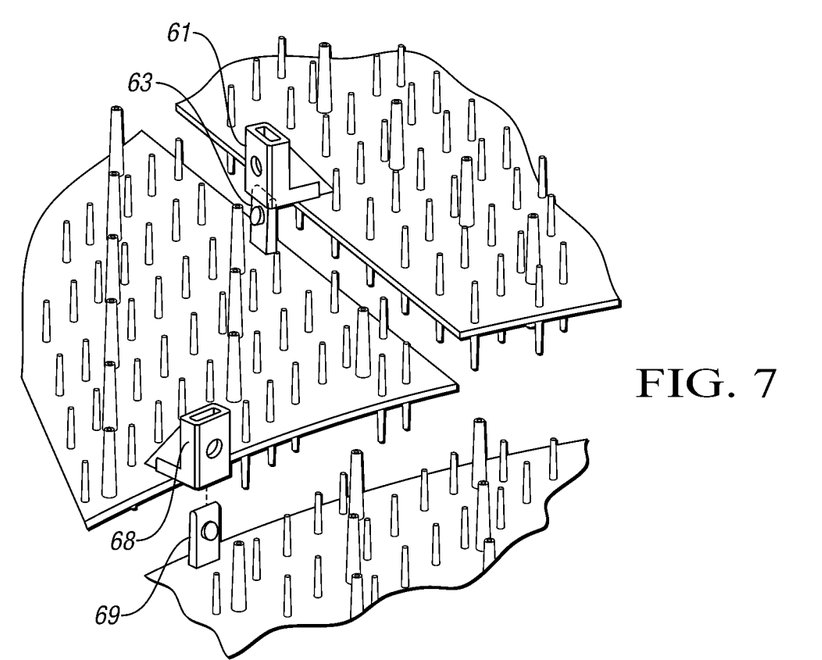
FIG. 7 is a quartering perspective view of three juxtaposed segments before being snap-fitted together.
Figure 8:
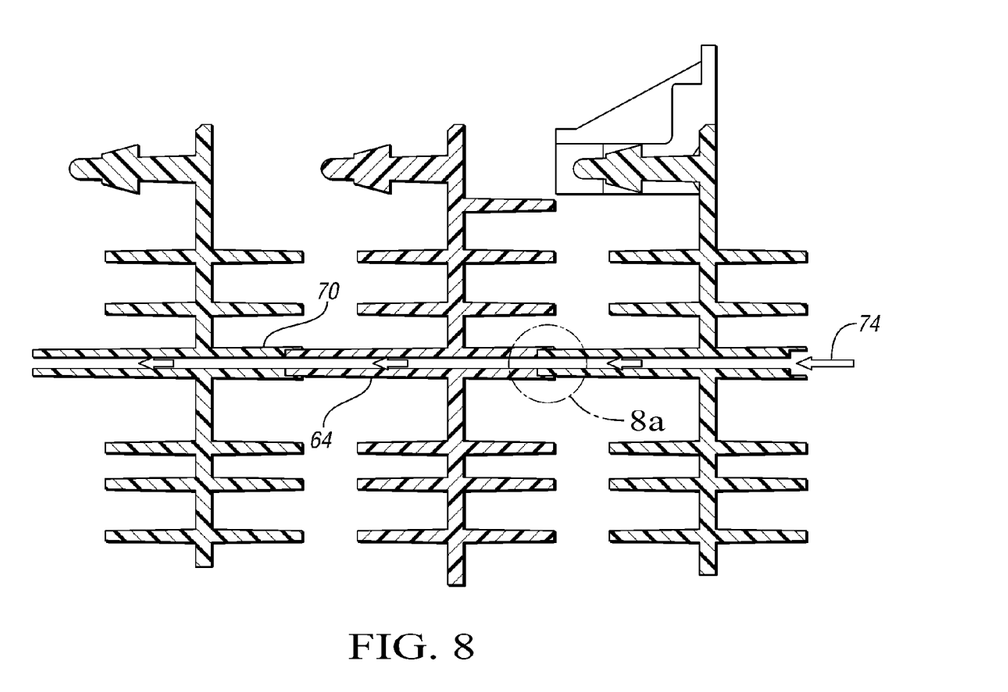
FIG. 8 is a sectional view of three connected disks showing an optional through-bore (water passage) that extends through interfitted connecting elements.

FIGS. 6-7 depict the snap fit cooperative connection 68, 69 of adjacent segments in a disk in more detail. It will be appreciated that in some embodiments, the second connection 68 may include a tapered channel so that progressive insertion of the first connector 69 may be made by an interference fit. Optionally, a lug or flange may extend from either the first or the second member and be received in the other member so that when the insertion step is complete, a positive engagement ("snap-fit") or registration action occurs.

By following the practices disclosed herein, assembly of the disks 20 is accomplished, if necessary in the field, without deploying any metal parts. This represents an advantage over several prior art practices in which any magnetic particles in wastewater may be attracted to conventional RBC media. Absent magnetic attraction, biomass can be easily detached from the inventive RBC media without reducing the productive surface area.

Thus, the inventive media offer a strong self-supporting RBC in which a given disk 20 is formed by, for example, one or more concentric rings 34 of segments 28 that are connected by snap fitting features 61, 63 which are positioned at spaced apart locations (e.g. 2 per edge) on the edge regions of disk segments.

Figure 8A:
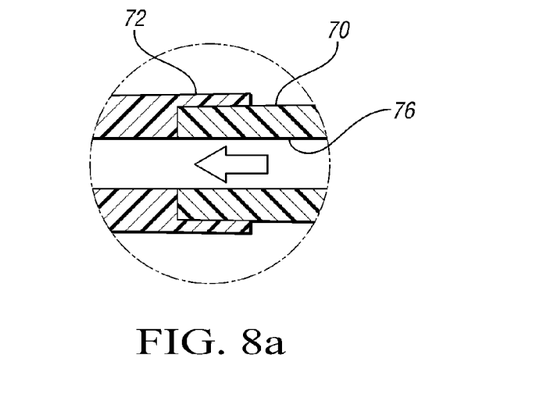
FIG. 8a is an enlargement of a portion of FIG. 8.

It will be appreciated that the optional hollow tubes 70 (FIGS. 8, 8a) allow wastewater to be transmitted therethrough. At the ends of a stage, if desired jets of water from for example a hose may slough off the dead biomass. This tends to avoid excessive buildup and promote circulation, especially in the annular planar surface 13 adjacent to the center of a disk 20 in proximity to the rotating shaft 8.

Because each assembly tends to be somewhat rigid in its structure, the disclosed RBC supports varying weights of biological buildups. This tends to prolong the useful life of the apparatus and reduce the incidence of shaft failure.

In one pilot test, 12,200 gallons per day of sewage were treated from an effluent sewer line and the treated effluent was returned into the wastewater treatment influent line. A series of experiments has demonstrated the effectiveness of the RBC technology which documents its low energy use, small footprint, high quality effluent, the transportability of the treatment technology, effectiveness through wide variations of inflow rate and viability through extended periods of minimal flows in compliance with all environmental regulations.

Influent wastewater was screened and allowed to settle. Fats, oils and greases and other floatables were collected before introducing the influent to the the RBC. In one series of tests, the shaft was rotated at 1 to 2 RPM (up to 15 RPM), and a layer of biological growth was observed in an amount of 2 to 4 mm in thickness that was rapidly established on the wetted surface of each disc.

After about three weeks of normal operation, a uniform biomass buildup was achieved. Periodic observations of various parameters were made and recorded. Those perimeters included:

1. BOD5—the biochemical oxygen demand of wastewater during decomposition occurring over a 5-day period. This is a measure of the organic content of wastewater. Typically, the dissolved oxygen is consumed by biological processes, while breaking down organic matters;

2. TSS—Total Suspended Solids is a measure of the solids suspended in wastewater, effluent, or water bodies, as determined by tests for total suspended non-filterable solids.

3. Other—Observations were made of $NH_3$ and $PO_4$ levels.

Although the invention is not so limited, one suitable illustrative variable frequency drive is manufactured by ABB (ACS355). Experiments have been performed with a 1 HP AC motor operating at about 1800 RPM, 230/460 volts; PN Y364-MARA.

LIST OF REFERENCE NUMERALS

| Ref. No. | Component |
| --- | --- |
| 1 | RBC system |
| 2 | Concrete or steel tank |
| 3 | Primary settling tank |
| 4 | Fluid inlet |
| 5 | Water |
| 6 | Processed water outlet |
| 7 | Wastewater mixing & oxidation wheel |
| 8 | Rotating shaft |
| 8a | Speed reducer gear box |
| 9 | Centrally located shaft-receiving aperture |
| 10 | Electric motor to rotate the media shaft |
| 11 | Flat |
| 11a | Power saver inverter drive |
| 12 | $1^{st}$ stage |
| 13 | Annular planar surface in disk |
| 13a | Fluid transfer pipe from 1st stage to $2^{nd}$ stage |
| 14 | Fluid transfer pipe from $2^{nd}$ stage to $3^{rd}$ stage |
| 15 | Front side load transfer and assembly mechanism |
| 16 | $2^{nd}$ stage |
| 17 | Rear side load transfer and assembly mechanism |
| 18 | $3^{rd}$ stage |
| 19 | Secondary settling tank |
| 20 | Disk |
| 21 | Load transfer mechanism connector pin |

-continued

| Ref. No. | Component |
| --- | --- |
| 22 | Media load transfer tube section ("wheel spoke") |
| 23 | Load transfer shaft coupling |
| 25 | Effluent treatment tank |
| 26 | Media coupling water & air mixer ("scoop" or "cup") |
| 28 | Disk segment |
| 29 | Radial edge of segment |
| 30 | Arcuate or circumferential edge |
| 31 | Front face of disk |
| 32 | Back face of disk |
| 33 | Turbulating posts |
| 34 | Rings of segments |
| 35 | Dump |
| 36 | Trough |
| 60 | Disk thickness-$1^{st}$ segment |
| 61 | Snap fit second (e.g., female) engagement feature |
| 62 | Disk thickness-$2^{nd}$ segment |
| 63 | Snap fit first (e.g., male) engagement feature |
| 64 | Connecting member (tall pin) |
| 66 | Connecting member (tall pin) |
| 68 | Snap fit second (e.g., female) engagement feature |
| 69 | Snap fit first (e.g., male) engagement feature |
| 70 | Tall pin tip section |
| 72 | Receiving tip configuration |
| 74 | Flow channel |
| 76 | Tall pin and bottom pin through-passage |

As required, detailed embodiments of the present disclosure are set forth herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A wastewater treatment facility with one or more rotating biological contactors, the facility comprising:

a rotatable shaft that is supported over a wastewater influent;

a control system in communication with the rotatable shaft for influencing rotational speed of the shaft, its time of rotation, its angular acceleration and its direction of rotation so that an overloaded accretion of biomass on the disk can be avoided by monitoring current flow (I) or power (W) if the current flow required to drive a motor and a reducing gear box and thus rotate the shaft exceeds a given amount, the current is reduced, then the rotational speed of the shaft diminishes and its direction of rotation can be reversed if desired after a period of rest, the control system also providing a slow buildup in speed as the shaft's rotational speed rises from 0 to a desired angular speed;

one or more stages for purifying the wastewater influent, at least one of the one or more stages being oriented transversely to the rotatable shaft and having one or more disk assemblies, with a number of disks, at least some of the disks comprising an inner planar one-piece surface that surrounds the shaft to promote biomass slough off and one or more concentric rings of segments that circumscribe the inner planar surface, wherein the inner planar surface defines a non-circular aperture that receives the rotating shaft, the aperture receiving the shaft in registration so that the shaft and the disk move in unison without slippage, the concentric rings of segments including on or more intermediate rings with segments that are joined to the periphery of the inner planar one-piece surface and an outer ring of segments that are connected to the periphery of the one or more intermediate rings, at least some of the segments being provided with:
two generally radially extending edges;
two peripheral circumferential edges that extend between the two radially extending edges;
a first snap-fit engagement feature extending from an edge of a segment; and
a second snap-fit engagement feature extending from an edge of another segment that enables adjacent segments to be fastened and thus cooperate to form a portion of a disk;

at least some of the disks also having:
a front face and a back face;
a plurality of turbulating posts extending from the front and back faces for agitating wastewater and offering surfaces to which microorganisms may attach for consuming contaminants from the wastewater and degrading the microorganisms; and
a plurality of tubular connecting extensions extending from the front and back faces, the extensions having tips and tip heights that exceed a height of the plurality of turbulating posts so that adjacent disks in a disk assembly are connected and spaced apart by a mating relationship between the tips of the turbulating posts.

2. The wastewater treatment facility according to claim 1, wherein one or more of the disks comprise a thermoplastic material.

3. The wastewater treatment facility according to claim 1, wherein one or more of the disks have a diameter up to about 15 feet.

4. The wastewater treatment facility according to claim 1, wherein one or more of the disks have a diameter up to about 6 feet.

5. The wastewater treatment facility according to claim 1, wherein one or more of the disks have a diameter up to about 3 feet.

6. The wastewater treatment facility according to claim 1, wherein there are three stages.

7. The wastewater treatment facility according to claim 1, wherein the one or more stages comprise a first and a second stage that each have two disk assemblies and a third stage that has one disk assembly.

8. The wastewater treatment facility according to claim 1, wherein the number of disks in a disk assembly is 2-99.

9. The wastewater treatment facility according to claim 1, wherein one or more disks lie in a plane having a topography that is substantially flat or curved with an axis of symmetry that lies orthogonally in relation to the rotatable shaft.

10. The wastewater treatment facility according to claim 1, wherein a curved topography lies substantially in the annular planar surface of the inner ring of the disk.

11. The wastewater treatment facility according to claim 1, wherein the posts curve downwardly in response to forces exerted by the biomass so that the biomass may slough off the disks.

12. The wastewater treatment facility according to claim 1, wherein the one or more stages comprise:
a first stage which treats active microorganisms and sludge so that the microorganisms attach themselves to a surface of a disk in a disk assembly in the first stage, multiply, form a biomass, and feed off contaminants using oxygen provided by ambient air;
a second stage that houses microorganisms including biodegradable trace elements and other contaminates;
a third stage in which ammonia and nitrogen comprise a majority of biodegradable contaminates remaining; and
a fourth stage in which a majority of the microorganisms include nitrifiers.

13. The wastewater treatment facility according to claim 1 wherein wastewater treated in a first stage enters a second stage for additional cleaning and to a third stage to remove impurities and flows to a secondary settling tank before ducting clean water to a river, pond or underground.

14. The wastewater treatment facility according to claim 1 wherein the aperture in the inner planar surface has a pair of opposing flat edges that are joined by opposing arcuate edges and the shaft has a pair of opposing flat longitudinally extending and rounded splines, the aperture receiving the shaft in registration so that the shaft and the disk move in unison without slippage.

15. The wastewater treatment facility according to claim 1 wherein the control system comprises
a user interface including a touch screen for monitoring operational data and entering parameters for adjusting system operation;
a programmable logic controller in communication with the user interface;
a power supply;
switching means for closing an electrical circuit that includes the user interface,
the programmable logic controller and the power supply;
circuit breaker means for interrupting current flow in the electrical circuit; and
an inverter drive for changing current flow to the electrical motor.

16. The wastewater treatment system according to claim 15, wherein the control system also includes a motor and a gear box in communication with the rotatable shaft.

17. The wastewater treatment facility according to claim 15, further including a control system for remotely monitoring the programmable logic controller through the worldwide web so that suppliers and customers may control and change the parameters for efficient and reliable operation of the facility.

18. The wastewater treatment facility according to claim 1, wherein there are four stages.

19. The wastewater treatment facility according to claim 18, wherein the stages comprise a first and a second stage that each have two disk assemblies and a third and fourth stage that each have one disk assembly.

20. A rotating biological contactor comprising:
a tank;
a rotatable shaft that is supported over wastewater influent that enters the tank;
a control system that influences the speed and time and direction of movement of the rotatable shaft, its time of rotation, its angular acceleration and its direction of rotation so that an overloaded accretion of biomass on the disk can be avoided by monitoring current flow (I) or power (W) if the current flow required to drive a motor and a reducing gear box and thus rotate the shaft exceeds a given amount, the current is reduced, then the rotational speed of the shaft diminishes and its direction of rotation can be reversed if desired after a period of rest, the control system also providing a slow buildup in speed as the shaft's rotational speed rises from 0 to a desired angular speed;

one or more stages for purifying incoming wastewater, at least one of the one or more stages being oriented transversely to the rotatable shaft and having one or more disk assemblies, each disk assembly having a number of disks, at least some of the disks comprising one or more concentric rings of segments, at least some of the segments being provided with:

two generally radially extending edges;

two peripheral circumferential edges that extend between the two radially extending edges;

a first snap-fit cooperative engagement feature extending from an edge of a segment; and a second snap-fit cooperative engagement feature extending from an edge of another segment that enables adjacent segments of a disk to be fastened and thus cooperate to form at least a portion of a disk, at least some of the disks being positioned between end plates and also having:

a front face and a back face;

a plurality of turbulating posts extending from the front and back faces for agitating wastewater and offering surfaces to which microorganisms may attach for consuming contaminants from the wastewater and degrading the microorganisms; and a plurality of connecting members extending from the front and back faces of a disk, the connecting members having tips and tip heights that exceed a height of the plurality of turbulating posts so that adjacent disks in a disk assembly are connected and spaced apart by a mating relationship between tips of the connecting members.

21. The rotating biological contactor according to claim 20, further including support and load transfer rods, wherein the end plates define apertures through which the support and load transfer rods extend axially to support disks that comprise an assembly.

22. The rotating biological contactor according to claim 21, further including tubes that extend through the apertures, the tubes offering an additional conduit through which fluid may flow.

* * * * *

UNITED STATES PATENT AND TRADEMARK OFFICE
CERTIFICATE OF CORRECTION

Page 1 of 1

PATENT NO. : 9,133,042 B2
APPLICATION NO. : 13/409248
DATED : September 15, 2015
INVENTOR(S) : Indra R. Baxi et al.

It is certified that error appears in the above-identified patent and that said Letters Patent is hereby corrected as shown below:

In the Claims

Column 13, Line 9, Claim 1:

After "the concentric rings of segments including"
Delete "on" and
Insert -- one --.

Signed and Sealed this
Fifth Day of July, 2016

Michelle K. Lee
*Director of the United States Patent and Trademark Office*